United States Patent [19]
Whitcomb

[11] 4,050,486
[45] Sept. 27, 1977

[54] APPARATUS FOR DELIMBING TREES
[75] Inventor: Paul H. Whitcomb, Attica, N.Y.
[73] Assignee: Eaton Yale Ltd., Canada
[21] Appl. No.: 748,080
[22] Filed: Dec. 6, 1976
[51] Int. Cl.² .............................................. A01G 23/08
[52] U.S. Cl. ..................... 144/2 Z; 83/600; 144/309 AC; 30/357
[58] Field of Search .............. 83/600; 144/2 Z, 3 D, 144/34 R, 34 E, 309 AC, 208 R, 208 E; 30/357, 353

[56] References Cited
U.S. PATENT DOCUMENTS

| | | | |
|---|---|---|---|
| 3,763,904 | 10/1973 | Exnon | 144/2 Z |
| 3,809,134 | 5/1974 | McCabe | 144/2 Z |
| 3,999,582 | 12/1976 | Allen et al. | 144/2 Z |
| 4,004,622 | 1/1977 | Hamilton | 144/2 Z |

Primary Examiner—Othell M. Simpson
Assistant Examiner—W. D. Bray
Attorney, Agent, or Firm—Teagno & Toddy

[57] ABSTRACT

A delimber blade having a central region beveled at a first angle to form a cutting edge at the tree engaging surface of the blade, and having opposed end regions beveled at first and second angles to form cutting edges spaced from the tree engaging surface of the blade. According to another aspect of the invention a plurality of blades is provided, all of which are identically shaped and sharpened.

6 Claims, 6 Drawing Figures

APPARATUS FOR DELIMBING TREES

The present invention relates to improved apparatus for harvesting trees, and more particularly to improved delimber blades for a tree harvesting apparatus.

In the mechanized harvesting of trees a common method for removing the limbs from a tree employs a plurality of curved or bent blades which are moved into contact with the trunk of the tree. The blades are then either moved along the tree trunk to shear off the limbs, or the blades are held stationary while the tree trunk is propelled through the blades.

U.S. Pat. No. 3,894,568 discloses a harvester apparatus in which four movable delimber blades and one stationary delimber blade are mounted on a processing head which travels along a horizontal boom to delimb a tree clamped in a stationary position on the boom. In U.S. Pat. No. 3,833,034 there is disclosed a harvester apparatus in which two movable delimber blades and one stationary delimber blade are mounted in a fixed position while a tree is propelled by a roller drive mechanism through the delimber blades, which are closed upon the trunk.

In both of the above types of harvester apparatus, the action of the individual delimber blades is the same. The movable blades are closed upon the tree trunk with sufficient pressure to maintain contact with the trunk and to maintain the trunk in contact with the stationary blade while the tree and blades move relative to one another. It can be appreciated that as a practical matter it is not possible for a blade type delimber to completely encircle a tree trunk from the base to the top without using a large number of blades and/or providing a complex mechanism for moving the blades into contact with the tree. Accordingly, the blades are arranged and shaped in a manner which permits adequate delimbing at all trunk diameters within the capacity range of the harvester. Because of the rough use to which such equipment is put it is important to keep the mechanism as simple as possible. It has been found that a delimber assembly employing no more than four movable blades, and preferably two movable and strategically shaped blades provides a good balance between design simplicity and effective delimbing coverage.

In designing blades to suit the above design considerations, one problem which arises is that the blades must be very sharp and cut close to the trunk to adequately delimb smaller branches near the top or small diameter portion of the tree; however, such blades tend to dig into the bark and carve valuable wood away from the larger diameter portions of the tree. Conversely, blades which are shaped to avoid this tendency do not provide clean delimbing of the smaller branches near the top of the tree.

Based on the above, it is an object of the present invention to provide a set of delimber blades for a tree harvester which are effective to cleanly delimb all branches within the diameter capacity of the tree harvester without undue wastage of wood.

Another object of the invention is to provide delimber blades which will not dig or gouge into the trunk of a tree when cutting relatively large branches, but which will still be effective to cut relatively small branches sufficiently close to the bark to provide satisfactory delimbing.

Another object of the invention is to provide a set of delimber blades which are simple and relatively inexpensive to manufacture.

Another object of the invention is to provide a delimber assembly comprising two movable blades and one stationary blade, all of which are bent or curved to the same angle and all of which are sharpened to the same profile or combination of profiles, and which are effective to cleanly cut all branches encountered in delimbing trees within the diameter capacity of the harvester apparatus.

To meet the above objectives the present invention provides a delimber assembly having a plurality of delimber blades, in which each blade includes a first region shaped to ride against the relatively large diameter portion of a tree trunk without digging into the bark of the tree, and a second region shaped to ride against the relatively small diameter portion of the tree trunk.

In accordance with a preferred embodiment of the invention the delimber assembly comprises a single stationary blade and a pair of blades movable into contact with the tree trunk, each of the blades being identically shaped in cross-section and bent to the same included angle for ease of manufacture, and interchangeability.

Other objects and advantages of the invention will become more apparent from the following description when taken in connection with the accompanying drawings, wherein.

Figure 1:
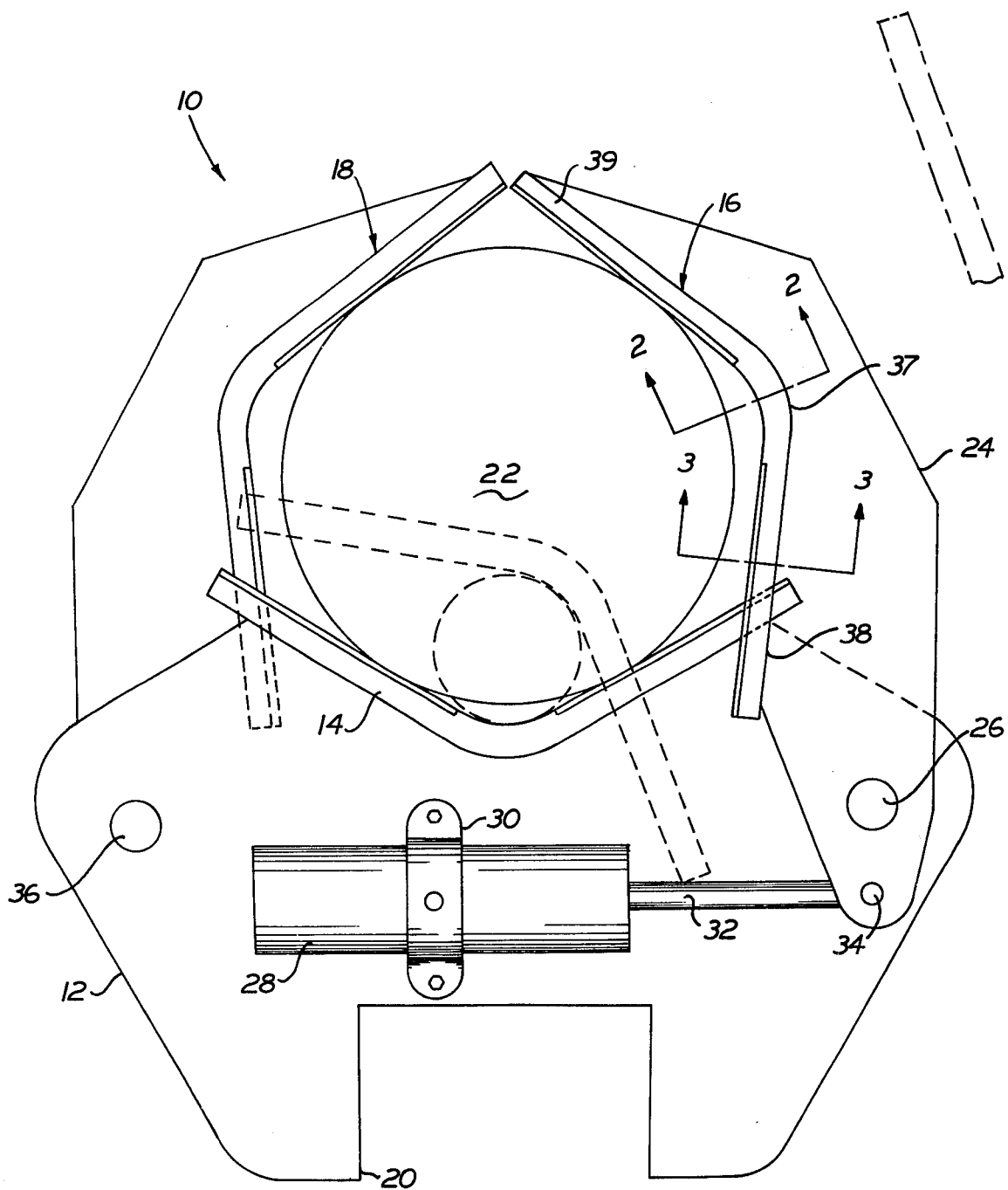
FIG. 1 is a rear elevation view of a delimber assembly constructed in accordance with the present invention.

Referring to FIG. 1, there is illustrated somewhat schematically a delimber assembly designated generally by the numeral 10. A tree harvester apparatus on which such a delimber assembly would be mounted is disclosed in detail in U.S. Pat. No. 3,894,568, and the disclosure thereof is incorporated herein by reference.

The delimber assembly 10 comprises a frame 12, a stationary delimber blade 14 welded or otherwise fastened to the frame, a first movable delimber blade assembly 16, and a second movable delimber blade assembly 18, both of the movable blade assemblies being pivotally mounted to the frame 12.

The frame 12 is mounted on an elongated processing boom (not shown), and is adapted to move along the boom to carry the delimber assembly along a tree held stationary on the boom. As described in detail in U.S. Pat. No. 3,894,568, a U-shaped opening 20 in the frame 12 straddles the processing boom, and a plurality of rollers (not shown) are mounted on the frame to mount the delimber assembly for linear movement relative to the boom. The delimber assembly can be moved along the frame by cables attached to the frame 12 in a conventional manner, as described in the above patent.

The stationary delimber blade 14 is mounted directly to the frame 12 by welding or bolting in a conventional manner. In the illustrated embodiment, the movable delimber blades 16 and 18 are staggered, the blade 16 being mounted forward of the stationary blade 14, and the blade 18 being mounted behind the stationary blade 14. The delimber assembly shown in FIG. 1 is adapted to move in a direction out of the paper relative to a tree 22 held within the blades for delimbing.

Movable delimber blade 16 is welded or otherwise fastened to an arm 24, which is pivotally attached to the frame 12 by means of a pivot pin 26. An hydraulic cylinder 28 is mounted on the frame 12 by means of a trunnion mount 30 and includes a piston rod 32 pivotally attached to the arm 24 at 34. The cylinder is operable to move the arm 24 between a fully open position depicted by the dot-dash outline of the blade 16, and an infinite number of positions closed upon a tree for delimbing. In FIG. 1 the solid line position of the blade 16 corresponds to a trunk diameter of about 12 inches, while the dash line position of blade 16 corresponds to a trunk diameter of about 4 inches. The minimum usable tree diameter is generally accepted to be about 3 inches; however, it can be appreciated that the illustrated blades are capable of closing upon smaller diameters.

Movable blade 18 is identical to blade 16; however, it is mounted on the opposite side of the frame 12 on a pivot pin 36. A cylinder (not shown) similar to cylinder 28 can be mounted on the opposite side of frame 12 to actuate blade 18, or blade 18 can be linked to blade 16 for actuation by cylinder 28. The details of the actuation of the delimber blades are not critical to the present invention.

In accordance with one aspect of the invention, the three blades 14, 16, 18 are identical in size, shape, and in the way they are sharpened, and are completely interchangeable. This greatly simplifies delimber maintenance, and reduces the number of different spare parts which must be stocked. Accordingly, only blade 16 will be described in detail, it being understood that every detail thereof applies equally to blades 14 and 18.

Figure 2:
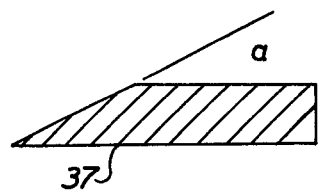
FIG. 2 is a sectional view taken along line 2-2 of FIG. 1.
Figure 3:
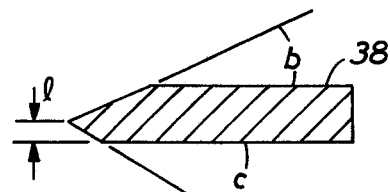
FIG. 3 is a sectional view taken alone line 3-3 of FIG. 1.

Referring to FIGS. 1, 2 and 3, the blade 16 is in the form of a shallow "V" which is sharpened to the profile shown in FIG. 2 in a central region designated 37, and to the profile shown in FIG. 3 in first and second outer regions designated 38, 39 extending from the central region outward.

Figure 4A:
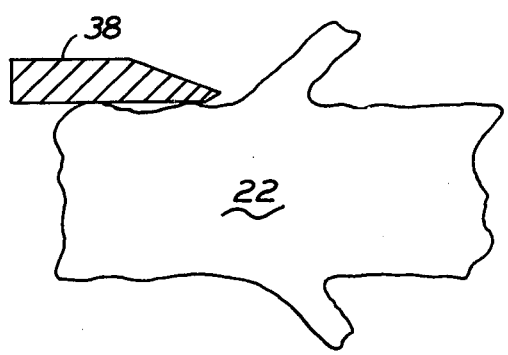
FIGS. 4A-4C are schematic representations of typical positions of portions of the delimber blades of the invention relative to different portions of a tree.
Figure 4B:
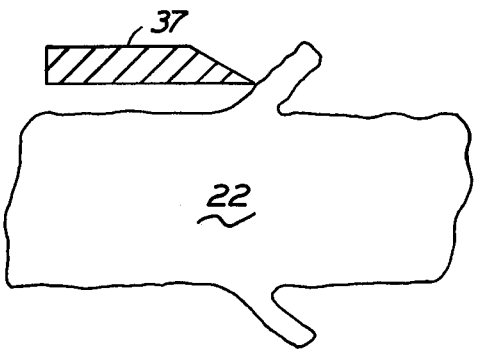
Figure 4C:
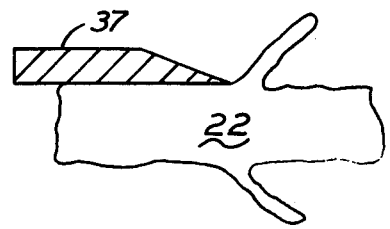

Referring to FIG. 2, the central region 37 of the blade is sharpened with a single bevel at an angle $a$, with the flat or unbeveled side of the blade in contact with the tree. As the delimber assembly moves along the tree, and the trunk diameter becomes relatively small, this region of the blade will contact the trunk as shown in FIG. 1. At the trunk diameter contacted by this portion of the blade it is desirable to have the blade tend to dig into the trunk somewhat in order to insure that the small limbs encountered will be cut off cleanly, as shown in FIG. 4C.

Referring to FIG. 3, the outer regions 38, 39 of the blade are sharpened with a first bevel at an angle $b$ on the side of the blade away from the trunk, and the edge of the blade is sharpened with a second bevel at an angle $c$ on the side of the blade is in contact with the tree. As shown in FIG. 1 the outer regions 38, 39 of the blade are in contact with the larger tree diameter, and the second bevel keeps the sharp edge slightly away from the trunk and does not tend to dig into the tree. At the same time, with the region 38, 39 in contact with the trunk the single beveled central region 37 will not ride in direct contact with the trunk, and accordingly will not tend to dig into the trunk.

Experience has shown that superior results are obtained with all three blades identically shaped, specifically with the blade bent to a central angle of 60°, with angle at $a$ 25°, angle $b$ at 22.5°, and angle $c$ at 30°. Good results can be expected with the central angle between 55° and 65°, with angles $a$ and $b$ between 20° and 30°, and with angle $c$ between 25° and 35°. The bevel at angle $c$ is somewhat exaggerated in size as shown, for clarity. Experience has shown that a bevel depth "1" of at least one-eighth inch gives good results, and that a depth between one-eighth inch and one-quarter inch is most desirable.

It has further been found that best results can be expected if the central region 37 makes up between 15% and 25% of the developed length of the blade.

I claim:

1. In apparatus for delimbing trees comprising a delimbing blade having an inner tree engaging surface, a parallel outer surface and a limb cutting edge formed on an edge of said blade between said parallel surfaces, the improvement wherein a central region of said blade is beveled at an angle from said outer surface to form said limb cutting edge substantially at said inner surface, and wherein second regions of said blade disposed on either side of said central region are beveled at a first angle from said outer surface and at a second angle from said inner surface to form said limb cutting edge along a line disposed between said inner and outer surfaces.

2. Apparatus as claimed in claim 1 in which said central region defines between 25 percent and 30 percent of the total developed length of said blade.

3. Apparatus as claimed in claim 1, in which said central region is beveled at an angle between 20° and 30°, and said second regions are beveled at a first angle between 20° and 30° and at a second angle between 25° and 35°.

4. Apparatus as claimed in claim 1, in which said second regions are beveled at said second angle to a depth of between one-eighth inch and one-quarter inch from said inner tree engaging surface.

5. Apparatus as claimed in claim 1 including a plurality of said delimbing blades, at least one of said blades being mounted in a fixed position and the remaining blades being mounted for movement to place said inner tree engaging surface in contact with the trunk of a tree.

6. Apparatus as defined in claim 5, in which each of said blades is curved about an axis perpendicular to said cutting edges to a central angle of between 55° and 65°.

* * * * *

UNITED STATES PATENT AND TRADEMARK OFFICE
CERTIFICATE OF CORRECTION

PATENT NO. : 4,050,486
DATED : September 27, 1977
INVENTOR(S) : Paul H. Whitcomb It is certified that error appears in the above-identified patent and that said Letters Patent are hereby corrected as shown below:

Col. 3, line 56: Delete "is" after "blade".

Col. 4, line 11: "angle at a 25°" should read "angle a at 25°".

Signed and Sealed this

*Seventh* Day of *February 1978*

[SEAL]

Attest:

RUTH C. MASON
*Attesting Officer*

LUTRELLE F. PARKER
*Acting Commissioner of Patents and Trademarks*